(12) United States Patent
Koba

(10) Patent No.: US 10,028,017 B2
(45) Date of Patent: Jul. 17, 2018

(54) INFORMATION PROCESSING DEVICE AND METHOD OF CONTROLLING INFORMATION PROCESSING DEVICE

(71) Applicant: CANON KABUSHIKI KAISHA, Tokyo (JP)

(72) Inventor: Toshinori Koba, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/565,048

(22) Filed: Dec. 9, 2014

(65) Prior Publication Data

US 2015/0172758 A1 Jun. 18, 2015

(30) Foreign Application Priority Data

Dec. 18, 2013 (JP) .................. 2013-261445

(51) Int. Cl.

| H04N 5/77 | (2006.01) |
|---|---|
| H04N 21/44 | (2011.01) |
| H04N 21/2187 | (2011.01) |
| H04N 21/4147 | (2011.01) |
| H04N 21/414 | (2011.01) |
| H04N 21/433 | (2011.01) |
| H04N 21/4335 | (2011.01) |
| H04N 21/845 | (2011.01) |
| H04N 9/804 | (2006.01) |
| H04N 9/806 | (2006.01) |

(52) U.S. Cl.
CPC ....... *H04N 21/44004* (2013.01); *H04N 5/772* (2013.01); *H04N 9/806* (2013.01); *H04N 9/8042* (2013.01); *H04N 21/2187* (2013.01); *H04N 21/4147* (2013.01); *H04N 21/41407* (2013.01); *H04N 21/4334* (2013.01); *H04N 21/4335* (2013.01); *H04N 21/8456* (2013.01)

(58) Field of Classification Search
USPC .................................. 386/223–229
See application file for complete search history.

(56) References Cited

U.S. PATENT DOCUMENTS

| 6,023,296 A * | 2/2000 | Lee ................ H04N 19/172 375/240.05 |
| 6,957,040 B1 * | 10/2005 | Tanaka ............ H04N 1/00127 348/207.2 |
| 7,836,477 B2 * | 11/2010 | Kuwata ............ H04N 5/23206 348/207.1 |
| 7,954,130 B2 | 5/2011 | Yanai |

(Continued)

FOREIGN PATENT DOCUMENTS

JP 2007-158552 A 6/2007

*Primary Examiner* — Nigar Chowdhury
(74) *Attorney, Agent, or Firm* — Fitzpatrick, Cella, Harper & Scinto

(57) ABSTRACT

An information processing device accepts an instruction to set a buffer size of a receiving buffer in which segment data obtained by dividing content data including at least one of video and audio is recorded, determines, among a plurality of pieces of segment data to be acquired, the segment data to be acquired based on a free capacity of the receiving buffer of the buffer size relating to the setting instruction, acquires the segment data to be acquired from an external device, and records the acquired segment data in the receiving buffer.

19 Claims, 16 Drawing Sheets

(56) References Cited

U.S. PATENT DOCUMENTS

| | | | | |
|---|---|---|---|---|
| 2002/0085636 | A1* | 7/2002 | Uenoyama | G06T 9/005 375/240.12 |
| 2002/0114393 | A1* | 8/2002 | Vleeschouwer | H04N 19/197 375/240.16 |
| 2004/0128343 | A1* | 7/2004 | Mayer | H04L 29/06 709/203 |
| 2004/0234253 | A1* | 11/2004 | Mahdavi | H04N 7/17336 386/277 |
| 2005/0237396 | A1* | 10/2005 | Hagiwara | H04N 5/781 348/231.99 |
| 2007/0109417 | A1* | 5/2007 | Hyttfors | H04N 5/232 348/211.99 |
| 2007/0130600 | A1 | 6/2007 | Yanai | |
| 2008/0246858 | A1* | 10/2008 | Omori | H04N 5/23245 348/231.99 |
| 2009/0022218 | A1* | 1/2009 | Kim | H04N 19/70 375/240.03 |
| 2009/0142068 | A1* | 6/2009 | Takahashi | H04B 10/1149 398/140 |
| 2009/0237513 | A1* | 9/2009 | Kuwata | H04N 1/00236 348/207.1 |
| 2009/0304348 | A1* | 12/2009 | Hio | G11B 27/322 386/223 |
| 2010/0003017 | A1* | 1/2010 | Nosaka | G11B 27/322 386/327 |
| 2010/0064029 | A1* | 3/2010 | Lundberg | H04N 7/183 709/219 |
| 2010/0134654 | A1* | 6/2010 | Tsuda | H04N 1/2112 348/231.1 |
| 2010/0182439 | A1* | 7/2010 | Morita | H04N 5/765 348/207.11 |
| 2011/0122270 | A1* | 5/2011 | Takagi | H04N 5/232 348/211.99 |
| 2011/0279726 | A1* | 11/2011 | Nishizawa | H04N 1/00453 348/333.05 |
| 2012/0050561 | A1* | 3/2012 | Kitajima | G06F 17/30265 348/222.1 |
| 2012/0219271 | A1* | 8/2012 | Vunic | G06K 9/00711 386/278 |
| 2012/0274801 | A1* | 11/2012 | Oyachi | H04N 5/2356 348/222.1 |
| 2014/0072270 | A1* | 3/2014 | Goldberg | H04N 9/87 386/223 |
| 2014/0098248 | A1* | 4/2014 | Okazaki | H04N 5/765 348/207.1 |
| 2016/0205302 | A1* | 7/2016 | Desai | H04N 5/2258 386/223 |

* cited by examiner

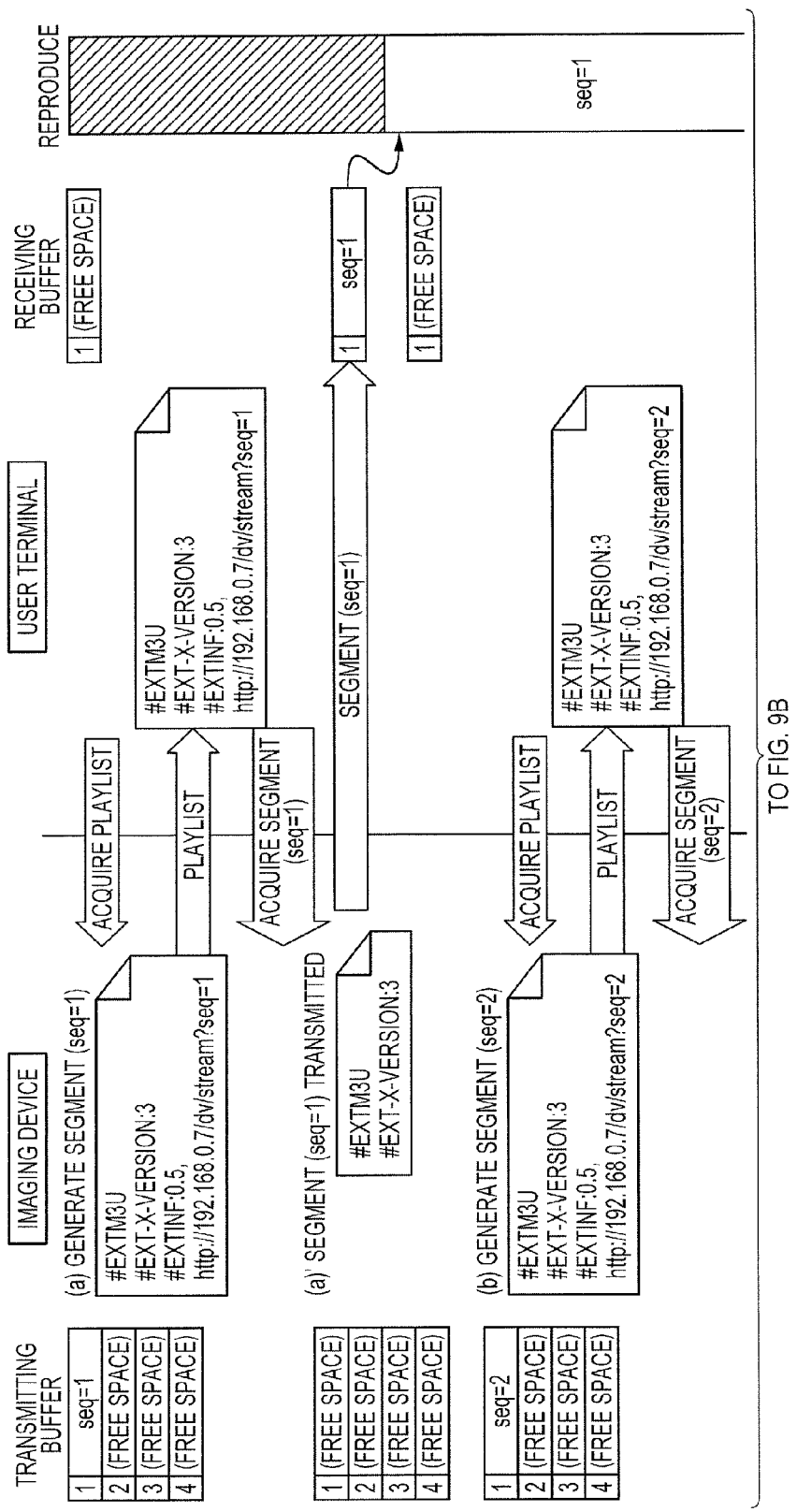

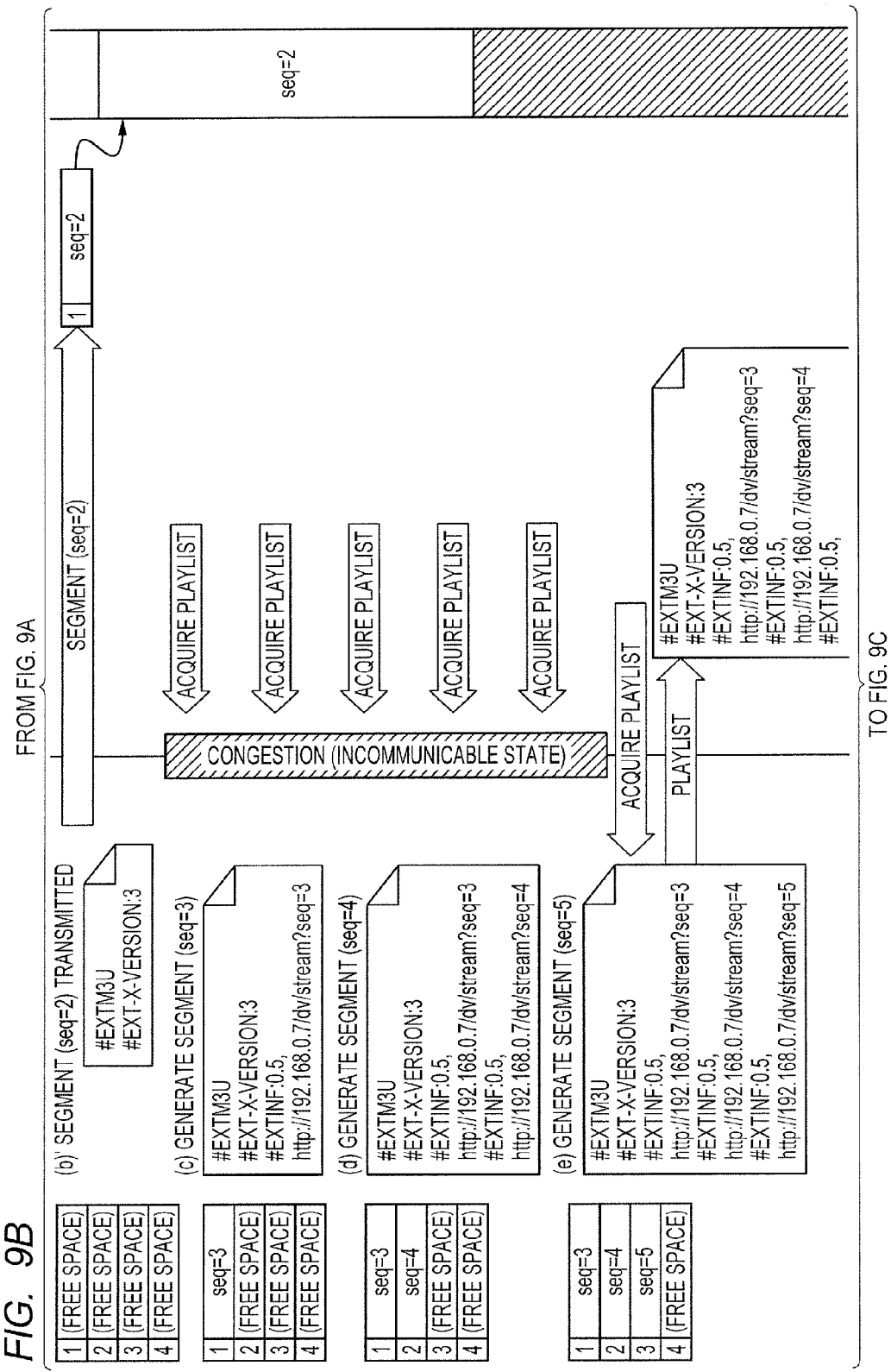

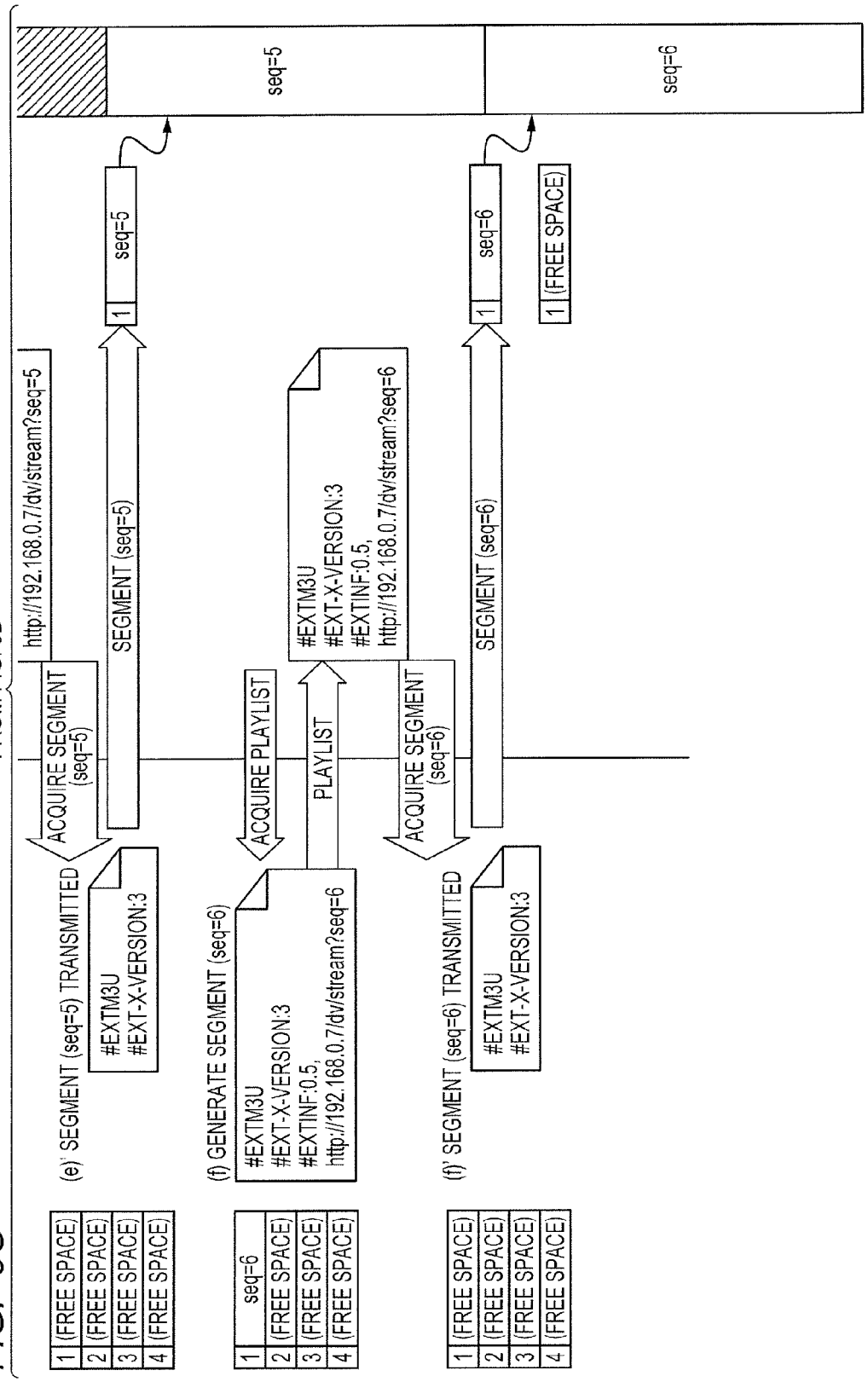

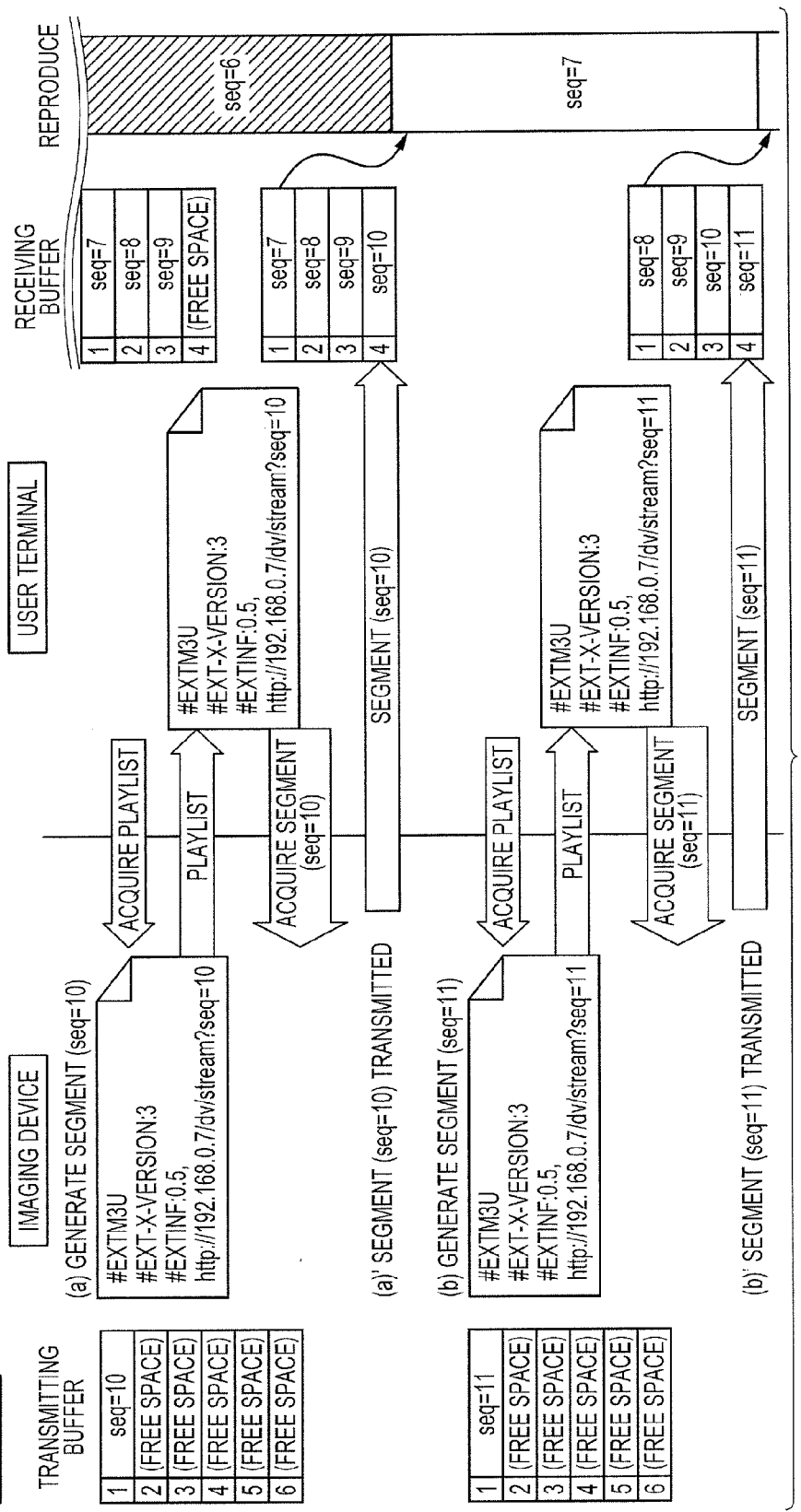

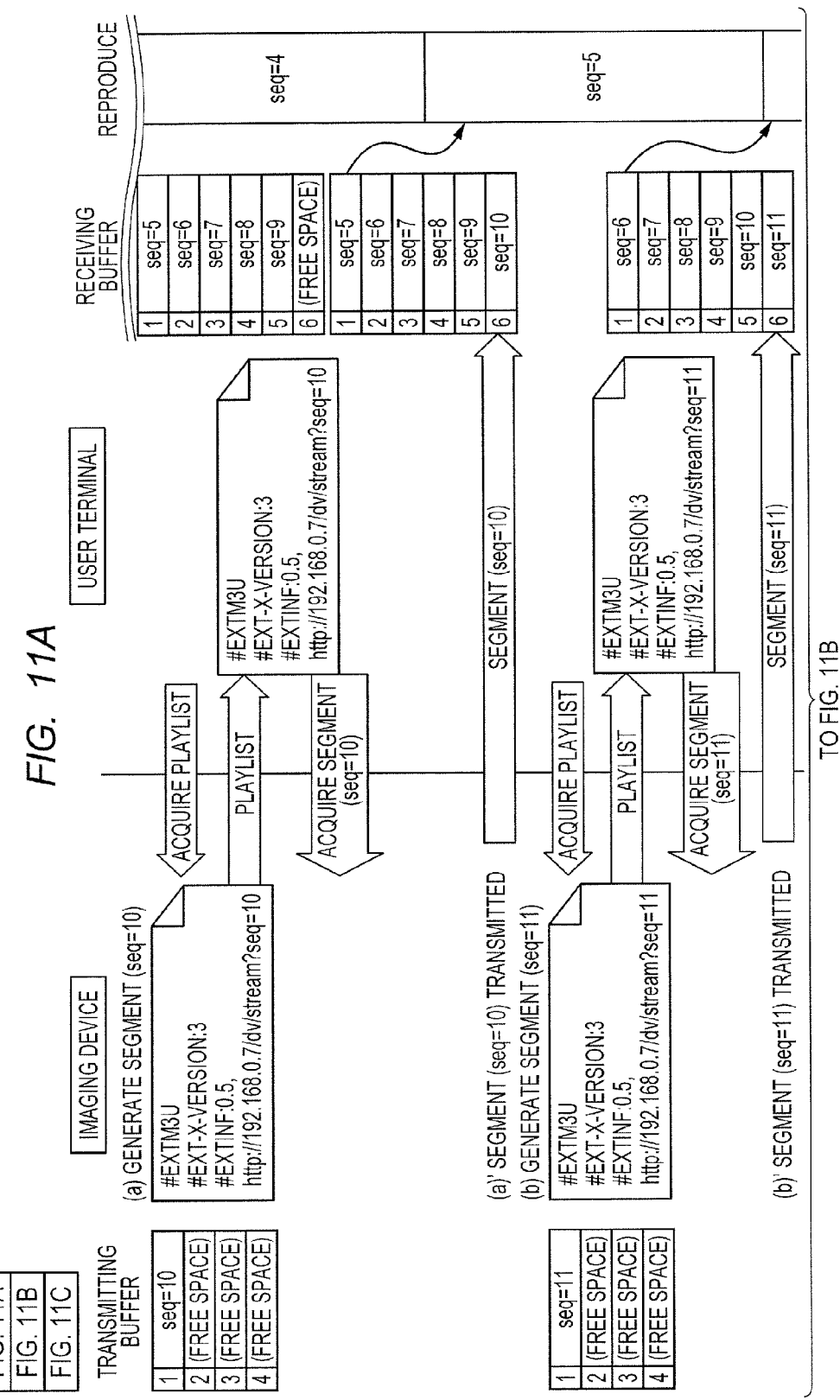

INFORMATION PROCESSING DEVICE AND METHOD OF CONTROLLING INFORMATION PROCESSING DEVICE

BACKGROUND OF THE INVENTION

Field of the Invention

The present invention relates to an information processing device and a method of controlling the information processing device.

Description of the Related Art

When a captured video image is streamed live, a real-time property is emphasized. Thus, a Realtime Transport Protocol (RTP)/User Datagram Protocol (UDP) has been used to transfer streaming data. Such so-called live streaming is generally used for viewing. However, this method is unsuitable for a case where streaming data is desired to be recorded in a receiving terminal because a data deficit may be generated. In contrast, Japanese Patent Application Laid-Open No. 2007-158552 discloses a technique for operating a camera by switching a normal mode in which the camera continuously transmits an acquired video image and a file transfer mode in which the camera stores a file once in response to an instruction from a client and transfer the file. On the other hand, a method of implementing streaming using a playlist including segment data obtained by dividing streaming data in a time unit and information about the segment data, for example, is also considered.

However, if data is acquired for the purpose of recording, a data delay does not become a great program while a data deficit becomes a problem. On the other hand, in streaming that emphasizes a live property, a data delay rather becomes a problem.

SUMMARY OF THE INVENTION

According to one aspect of the present invention, an information processing device includes: an accepting unit configured to accept an instruction to set a buffer size of a receiving buffer in which segment data obtained by dividing content data including at least one of video and audio is recorded; a determining unit configured to determine, among a plurality of pieces of segment data to be acquired, the segment data to be acquired based on a free capacity of the receiving buffer of the buffer size relating to the setting instruction; an acquiring unit configured to acquire the segment data to be acquired from an external device; and a recording unit configured to record the segment data acquired by the acquiring unit in the recording buffer.

According to another aspect of the present invention, a method of controlling an information processing device, includes: accepting an instruction to set a buffer size of a receiving buffer in which segment data obtained by dividing content data including at least one of video and audio is recorded; determining, among a plurality of pieces of segment data to be acquired, the segment data to be acquired based on a free capacity of the receiving buffer of the buffer size relating to the setting instruction; acquiring the segment data to be acquired from an external device; and recording the acquired segment data in the receiving buffer.

Further features of the present invention will become apparent from the following description of exemplary embodiments with reference to the attached drawings.

BRIEF DESCRIPTION OF THE DRAWINGS

FIG. 9 is comprised of FIGS. 9A, 9B and 9C illustrating a situation of live streaming during congestion.

DESCRIPTION OF THE EMBODIMENTS

Exemplary embodiment of the present invention will be described below with reference to the drawings. A system according to the present embodiment includes a transmitting device functioning as a server of live streaming and a user terminal functioning as a client. The transmitting device sequentially transmits content data to be streamed. Thus, a video image can be viewed by live streaming in the user terminal. Details of the live streaming will be described below.

In the present embodiment, an imaging device, which sequentially transmits video image data captured by itself to the user terminal in real time, will be described as an example of the transmitting device. The imaging device includes a digital video camera, a camera-equipped mobile phone, and a tablet terminal. The user terminal includes an information processing device such as a personal computer, a mobile phone, a tablet terminal, and a television set.

Figure 1:
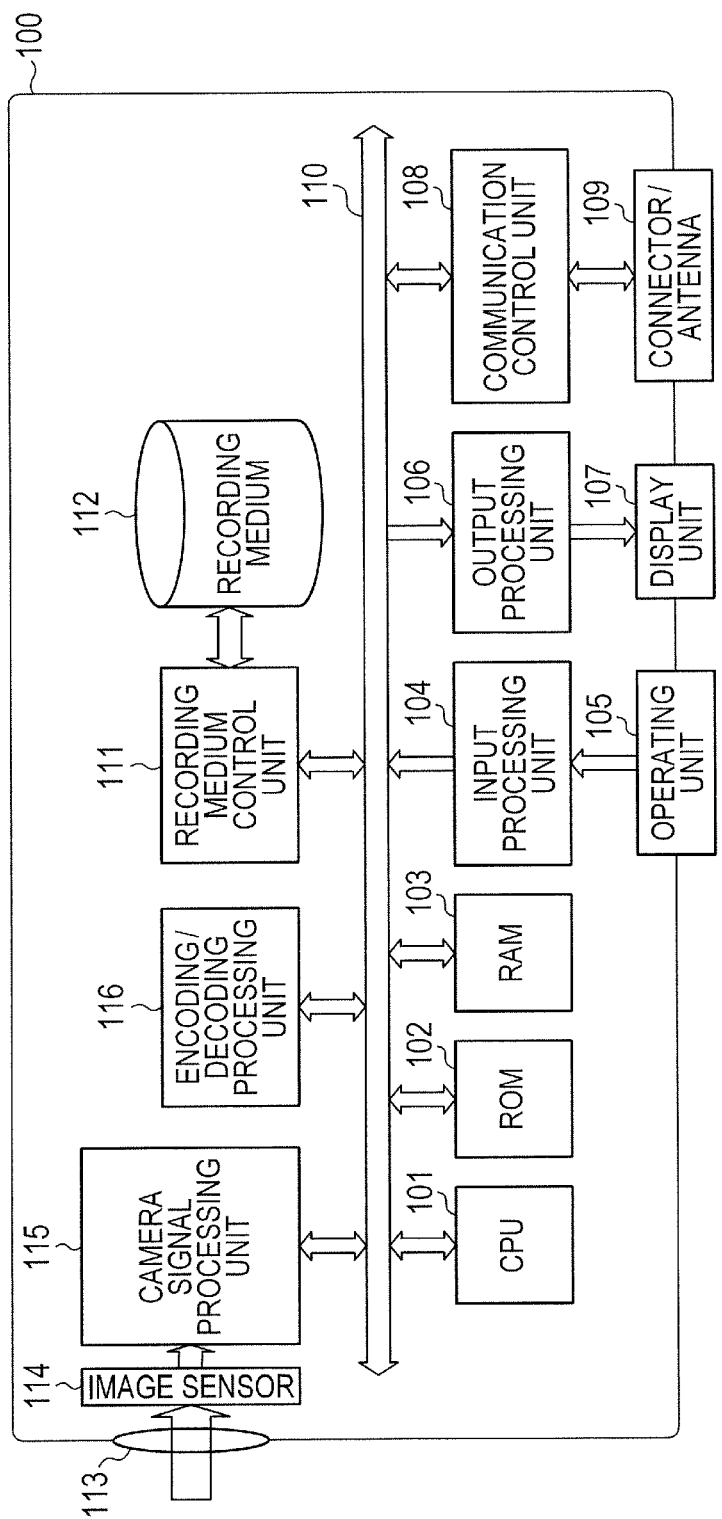
FIG. 1 illustrates an imaging device.

FIG. 1 illustrates an imaging device 100. The imaging device 100 includes a central processing unit (CPU) 101, a read only memory (ROM) 102, and a random access memory (RAM) 103. The imaging device 100 further includes an input processing unit 104, an output processing unit 106, a communication control unit 108, a recording medium control unit 111, a camera signal processing unit 115, and an encoding/decoding processing unit 116. The units can be connected to an internal bus 110 to exchange data with one another. The imaging device 110 also includes an optical system 113 and an image sensor 114.

The CPU 101 controls each of the units in the imaging device 100 using the RAM 103 as a work memory according to a program stored in the ROM 102 or the recording medium 112. The ROM 102 stores various types of programs and setting data for causing the CPU 101 to operate. The ROM 102 also includes a flash memory. The RAM 103 stores a program and a variable required during an operation by the CPU 101 and temporary data for working, as needed. A function and processing of the imaging device 100, described below, can be implemented when the CPU 101 reads out the program stored in the ROM 102 and executes the program.

The input processing unit 104 receives a user operation in the operating unit 105, generates a control signal according to the operation, and supplies the generated control signal to the CPU 101. For example, the operating unit 105 includes a character information input device such as a keyboard and a pointing device such as a mouse or a touch panel as an input device that receives the user operation. The operating unit 105 also includes a remotely operable device such as an infrared remote control. For example, the touch panel is an input device that outputs coordinate information corresponding to a position brought into contact with a planarly configured input unit. Thus, the imaging device 100 can be made to perform an operation corresponding to the user operation. The output processing unit 106 outputs a display signal for performing display on the display unit 107 based on display data such as Graphical User Interface (GUI) generated according to the program by the CPU 101.

If the touch panel is used as the operating unit 105, the operating unit 105 and the display unit 107 can be integrally configured. For example, the touch panel is configured so that light transmittance does not prevent the display on the display unit 107, and is attached to an upper layer of a display surface of the display unit 107. Input coordinates on the touch panel and display coordinates on the display unit 107 are associated with each other. Thus, the GUI can be configured as if a user was able to directly operate a screen displayed on the display unit 107.

The communication control unit 108 communicates with an external device such as a user terminal 200 (see FIG. 2) via a connector (wired)/antenna (wireless) 109 based on control of the CPU 101. A communication method can include wireless Institute of Electrical and Electronic Engineers (IEEE) 802.11, Bluetooth (registered trademark), and wired IEEE 802.3.

The recording medium control unit 111 is connected to the recording medium 112 such as a hard disk drive (HDD) or a nonvolatile semiconductor memory, to read out data from the recording medium 112 and write data into the recording medium 112 based on the control of the CPU 101. To the recording medium control unit 111, a nonvolatile semiconductor memory which can be detachably attached, such as a memory card, for example, may be connected, via a socket or the like, as the recording medium 112. The recording medium 112 can also record information required to control the CPU 101 in addition to the video image data (content data) obtained by imaging.

The optical system 113 is an imaging lens including a focus and a diaphragm mechanism, and forms an optical image of an object. The image sensor 114 includes a charge coupled device (CCD) or a complementary metal oxide semiconductor (CMOS), and includes an analog-to-digital (A/D) converter, to convert an optical image of the object, which has been formed by the optical system 113, into an analog electric signal, and then convert the analog electric signal into a digital signal. The camera signal processing unit 115 performs resize processing such as predetermined pixel interpolation and reduction, color conversion, and various types of correction processing for the digital signal obtained by the conversion in the image sensor 114 based on the control of the CPU 101.

The encoding/decoding processing unit 116 compresses and encodes the digital signal processed by the camera signal processing unit 115 at a predetermined bit rate and in a predetermined format or decodes compressed and encoded video image data based on the control of the CPU 101.

A case where content data serving as a live streaming target is video image data will be described as an example in the present embodiment, the content data may be data including at least one of video and audio. If the content data includes both video and audio, the imaging device 100 serving as a transmitting device further includes a microphone, an A/D converter that digitizes an analog signal of the audio, and an encoding unit that encodes digital data. In this case, the imaging device 100 simultaneously collects the audio together with video data when recording the video image data. In the encoding/decoding processing unit 116, the video image and the audio are multiplexed, to generate the video image data with the audio.

As another example, the content data may be data not including video but including only audio data. In this case, the imaging device 100 may only generate audio data. In this case, the imaging device 100 may not have a camera function.

A hardware configuration of the imaging device 100 is not limited to that in the present embodiment. As another example, one piece of hardware of the imaging device 100 may perform display control, communication control, recording control, and image processing control, and may function as the respective units in the imaging device 100. As another example, a plurality of pieces of hardware of the imaging device 100 may cooperate with one another to function as one unit.

Figure 2:
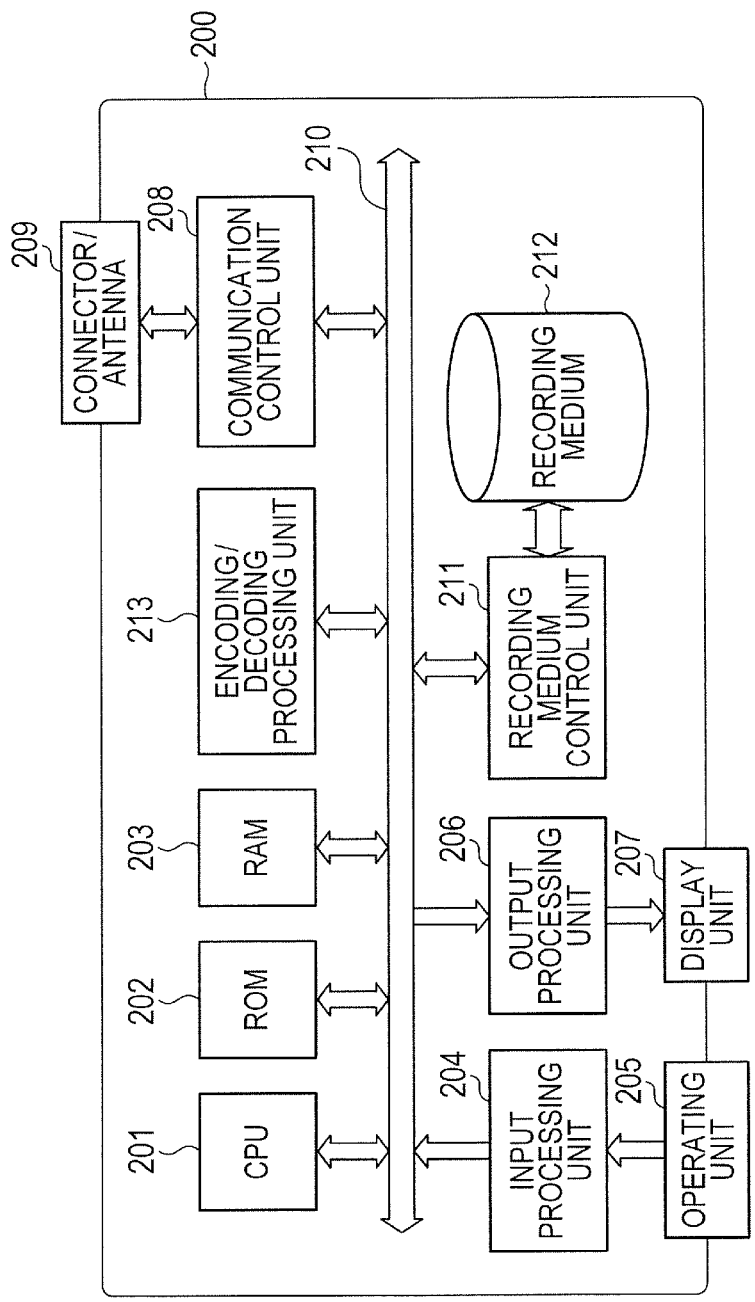
FIG. 2 illustrates a user terminal.

FIG. 2 illustrates a user terminal 200 serving as an information processing device. The user terminal 200 includes a CPU 201, a ROM 202, a RAM 203, an input processing unit 204, an output processing unit 206, a communication control unit 208, a recording medium control unit 211, and an encoding/decoding processing unit 213. The units are connected to an internal bus 210 to exchange data with one another. The recording medium control unit 111 is connected to a recording medium 212. An operating unit 205 is provided for the input processing unit 204. A display unit 207 is provided for the output processing unit 206. A connector/antenna 209 is provided for the communication control unit 208. The units are respectively substantially similar to the corresponding units in the imaging device 100. The encoding/decoding processing unit 213 in the user terminal 200 decodes the compressed and encoded video image data and further re-encodes the decoded data, as needed, based on the control of the CPU 201.

A function and processing of the user terminal 200, described below, are implemented when the CPU 201 reads out a program stored in the ROM 202 and executes the program.

The imaging device 100 and the user terminal 200 use Hyper Text Transfer Protocol (HTTP) as a communication protocol. The imaging device 100 and the user terminal 200 correspond to Universal Plug and Play (UPnP) in communication connection.

Figure 3:
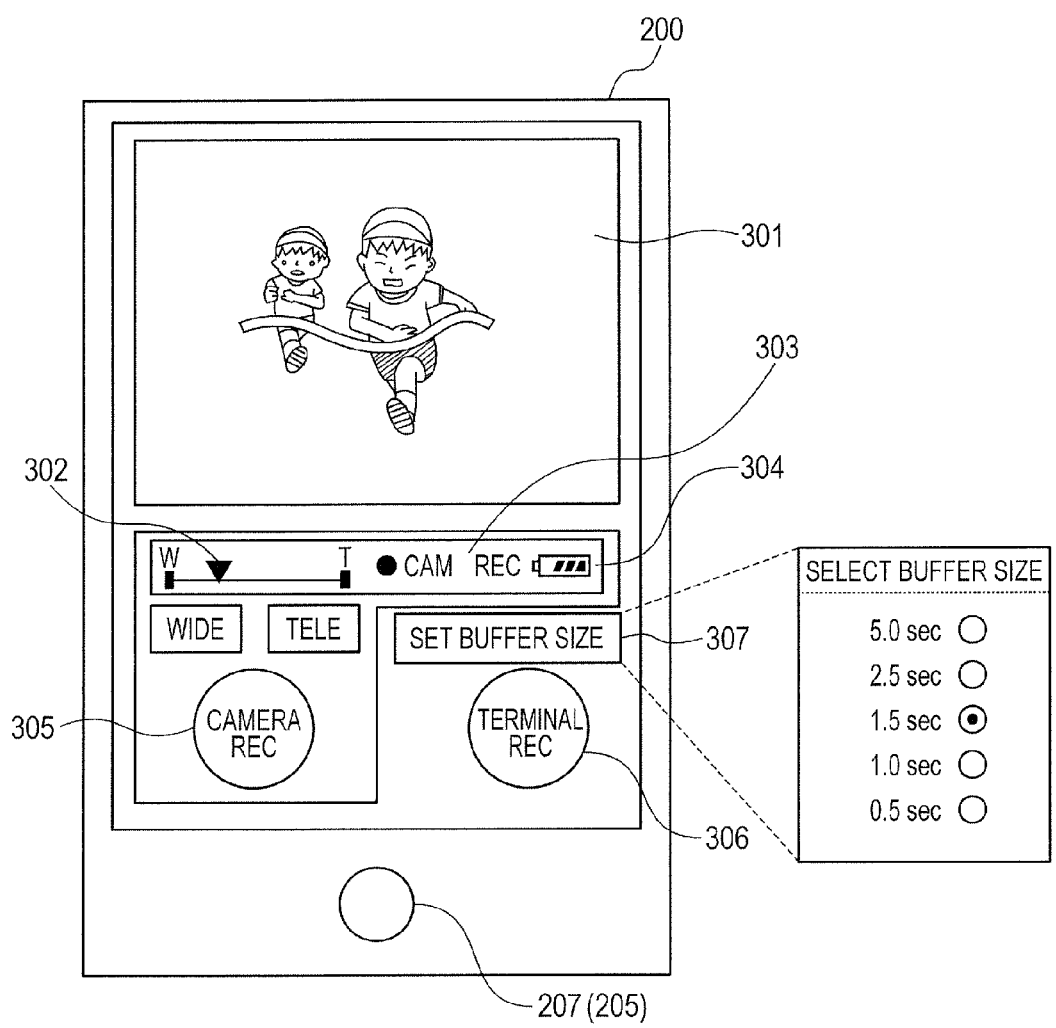
FIG. 3 illustrates an example of an application screen.

FIG. 3 illustrates an example of an application screen of live streaming. In FIG. 3, the user terminal 200, into which the operating unit 205 and the display unit 207 are integrated, is illustrated. A display area 301 is an area where streaming data obtained by the live streaming is displayed. A zoom position icon 302, a recording state icon 303, and a battery icon 304 are icons for accepting an instruction relating to a status of the imaging device 100 from the user. A camera REC icon 305 is an icon for accepting a camera recording instruction for recording and storing data obtained by imaging by the imaging device 100 in the recording medium 112 from the user.

A terminal REC icon 306 is an icon for accepting an instruction to set a data recording mode in which streaming data received from the imaging device 100 is recorded and stored in the recording medium 212 from the user. A buffer size setting icon 307 is an icon for accepting an instruction to set a buffer size (capacity) of a receiving buffer in which streaming data received from the imaging device 100 by the user terminal 200 is temporarily recorded. The receiving buffer is provided in the RAM 203 or the recording medium 212, for example.

In the present embodiment, when the user selects the buffer size setting icon 307, options for the buffer size are displayed on the display unit 207. The user can select the desired buffer size. When the user selects the buffer size, the user terminal 200 accepts an instruction to set the selected buffer size. This is an example of accepting processing.

Values selectable as the buffer size are integral multiples of a reference time length Ts (sec) of segment data serving as a division unit of streaming data. However, a buffer size to be actually assigned can be calculated from a maximum bit rate of the segment data. In the present embodiment, the reference time length Ts is 0.5 seconds. Correspondingly, values, which are integral multiples of 0.5 seconds, are set to the options for the buffer size, as illustrated in FIG. 3.

Figure 4:
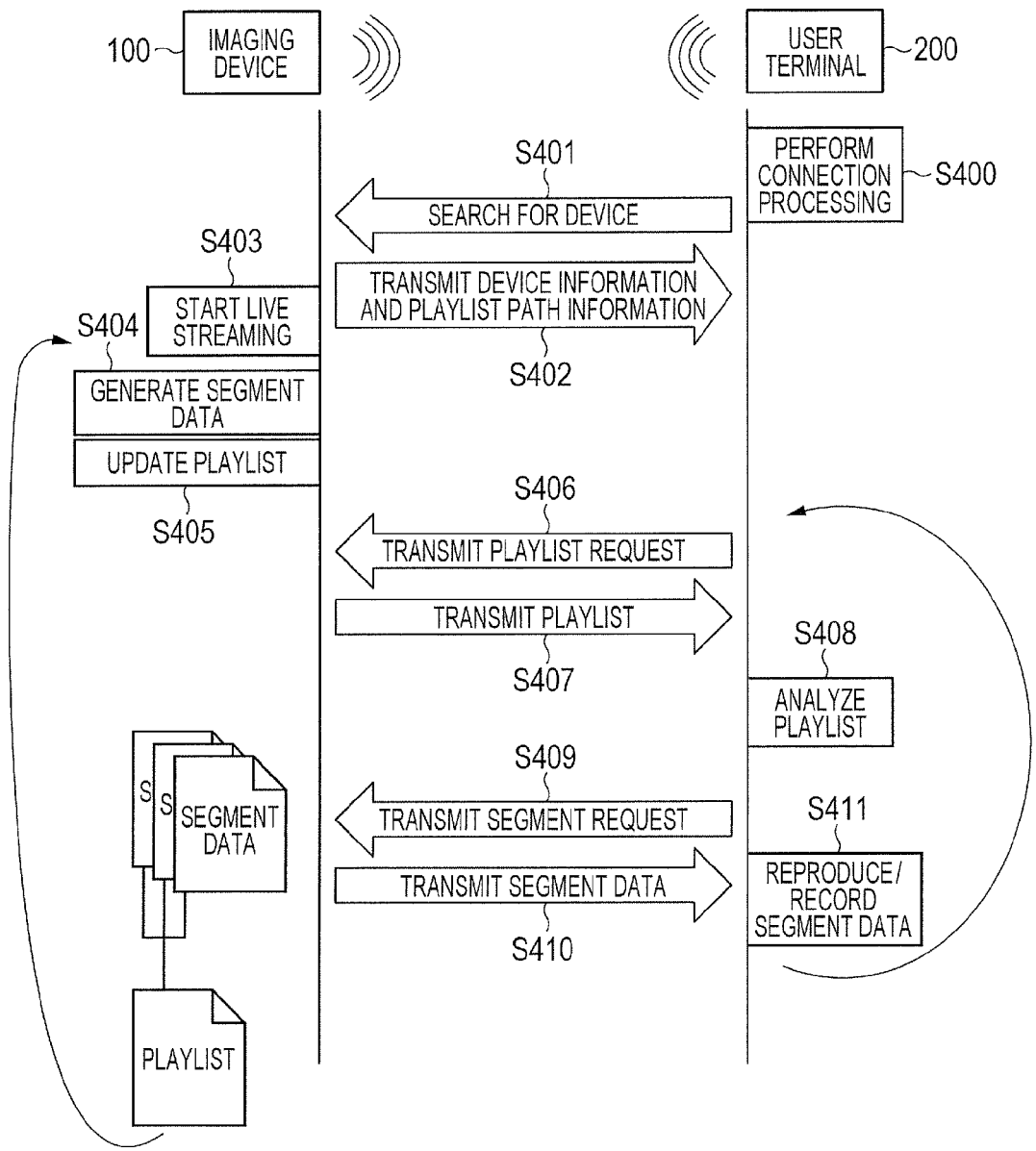
FIG. 4 is a sequence diagram illustrating live streaming processing.

FIG. 4 is a sequence diagram illustrating an outline of live streaming processing. When the user selects a live streaming mode by operating the operating unit 105 in the imaging device 100, the CPU 101 in the imaging device 100 accepts an instruction to start the live streaming mode, and starts the live streaming mode. The CPU 101 brings the communication control unit 108 into a communicable state.

When the user selects the live streaming mode by operating the operating unit 205 in the user terminal 200, the CPU 201 in the user terminal 200 accepts an instruction to start the live streaming mode, and starts the live streaming mode. The CPU 201 performs processing for connecting communication with the imaging device 100. Further, the CPU 201 starts an application required for live streaming.

In step S400, the CPU 201 in the user terminal 200 then controls the communication control unit 208 according to this application, starts communication with the imaging device 100, and performs connection processing. The user terminal 200 sets an Internet Protocol (IP) address designated by the user when connected to a network. The user terminal 200 sets the IP address by Dynamic Host Configuration Protocol (DHCP) or AutoIP when the IP address is not designated. In step S401, a device, which has acquired the IP address, searches for a device and acquires information such as a type of response device and a service function by "device discovery and control" to mutually recognize another device on the network.

In step S402, the imaging device 100 transmits device information and playlist path information to the user terminal 200 as a response to a device search request. The playlist path information is device-specific information used for accessing a playlist. The playlist path information includes information representing an address of a recording place and a file name of the playlist, for example.

In step S403, the imaging device 100 starts the live streaming when processing for connection with the user terminal 200 is completed. In the live streaming, the CPU 101 in the imaging device 100 starts to output a signal from the image sensor 114. The signal output from the image sensor 114 is converted into appropriate video image data by processing of the camera signal processing unit 115. This video signal is delivered to the encoding/decoding processing unit 116. At this time, information about a camera status such as a zoom magnification (or a focal length) is also delivered to the encoding/decoding processing unit 116.

The encoding/decoding processing unit 116 compresses and encodes the received video image data at a predetermined bit rate and in a predetermined format. In step S404, the encoding/decoding processing unit 116 further divides the video image data in units of a reference time length Ts (sec), to generate segment data, and records the generated segment data in a transmitting buffer. The transmitting buffer is provided in the RAM 103 or the recording medium 112.

The reference time length Ts serving as a unit of segment data is previously set in the ROM 102, for example.

The CPU 101 generates path information used for accessing segment data. The path information is information referred to when the user terminal 200 acquires the segment data. The path information is information for accessing the segment data, such as an address of a recording place and a file name of the segment data. In step S405, the CPU 101 updates the playlist based on the segment data.

Figure 5:
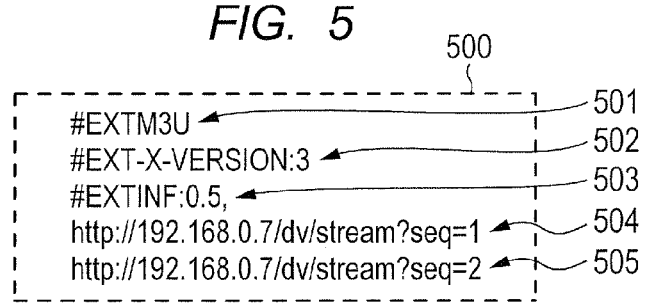
FIG. 5 illustrates an example of a playlist.

FIG. 5 illustrates an example of the playlist. The imaging device 100 uses a sliding window playlist for updating, every time new segment data is generated, the playlist to a playlist having a new content (deleting or adding data).

An identifier tag is described in a first row 501 of the playlist 500. A tag representing a version of the playlist and the version are described in a second row 502. In the example illustrated in FIG. 5, "3" is described as the version. A reference time length of segment data is described in a third row 503. In the present embodiment, "0.5 (sec)" is described as the reference time length.

Path information of segment data, which can be transmitted by the imaging device 100, is described in a fourth row 504. If two segment data are generated, pieces of path information of the generated segment data are described in not only a fourth row 504 but also a fifth row 505. If a plurality of pieces of segment data thus exists, respective path information of the plurality of pieces of segment data are described in the fourth row and the subsequent rows.

The path information of the segment data in the playlist 500 are updated every time the segment data is generated. If the segment data is deleted from the RAM 103 or the like, the path information of the deleted segment data is deleted. In the playlist 500, the reference time length and the path information are required to be continuously described as segment data-related information.

Referring to FIG. 4 again, in step S406, the user terminal 200 transmits a playlist request (HTTP GET method) to the recording place of the playlist included in the playlist path information when the reference time length Ts (sec) has elapsed from a timing of the start of the live streaming. More specifically, the user terminal 200 transmits a playlist request after an elapse of the reference time length Ts (sec) from a timing at which the playlist path information has been received. The reference time length is previously set in the ROM 202 in the user terminal 200. As another example, the device information to be transmitted by the imaging device 100 may include the reference time length. In this case, the user terminal 200 can obtain the reference time length as the device information.

In step S407, the imaging device 100 transmits a playlist 500 including one segment data as a response to the playlist request. In step S408, the user terminal 200 analyzes the acquired playlist. In step S409, the user terminal 200 transmits the segment request (HTTP GET method) to a transmission destination specified by the path information. In the present embodiment, the user terminal 200 transmits the segment request to the imaging device 100.

When the playlist request and the segment request are transmitted (steps S406 and S409), the user terminal 200 transmits an ID unique to the user terminal 200 or an application that is being activated on the user terminal 200, together with the playlist request and the like, to the imaging device 100. The imaging device 100 transmits data to only the user terminal 200 serving as a transmission source of a request first received. More specifically, in the present embodiment, the imaging device 100 and the user terminal 200 perform streaming in a one-to-one connection manner.

In step S410, the imaging device 100 transmits segment data relating to the segment request as a response. The user terminal 200 temporarily records the acquired segment data in the receiving buffer. In step S411, the user terminal 200 reproduces and records the segment data. Specifically, the CPU 201 in the user terminal 200 stores segment data having a time length corresponding to a buffer size set according to an operation in the buffer size setting icon 307 from the user in the user terminal 200 when the transmission of the segment data is started.

The CPU 201 then delivers the segment data recorded in the receiving buffer to the encoding/decoding processing unit 213. The encoding/decoding processing unit 213 decodes the delivered segment data. The decoded segment data is reproduced and displayed on the display unit 207 via the output processing unit 206.

Further, when user selects the terminal REC icon 306, to set the data recording mode, the CPU 201 records the decoded segment data or a data portion obtained by removing a header from the segment data in the recording medium 212. The CPU 201 records the sequentially recorded segment data in the recording medium 212 while coupling the segment data.

The imaging device 100 repeats the segment generation processing (S404) and the playlist updating processing (S405) every time the reference time length Ts (sec) elapses while executing the streaming. The imaging device 100 also deletes the segment data, which has been transmitted to the user terminal 200, and the segment data, which is older than the transmitted segment data in terms of generation timings, from the playlist 500.

On the other hand, in step S406, the user terminal 200 performs the playlist request processing every time the reference time length Ts (sec) elapses. The user terminal 200 acquires the segment data based on the playlist received as a response, and reproduces and records the segment data (steps S407 to S411).

As described above, if a communication status is good, a series of processes in steps S404 to S411 is periodically repeated after the streaming is started (step S403). However, the imaging device 100 and the user terminal 200 may actually be incommunicable with each other due to congestion. When a communication failure thus occurs, the user terminal 200 cannot periodically receive segment data.

To perform stable reproduction against such a problem, data corresponding to a predetermined data size are generally stored up to the start of reproduction, i.e., the start of processing of the encoding/decoding processing unit 213 after the segment data has been received in the user terminal 200. The larger the size of the stored data is, the less easily the data are affected by a delay of communication. However, in this case, a delay time period from an imaging timing to a reproduction timing is lengthened. On the other hand, in the user terminal 200 according to the present embodiment, a buffer size of the receiving buffer can be set according to an instruction from the user. Thus, the user terminal 200 can perform streaming corresponding to an application of the user.

Figure 6:
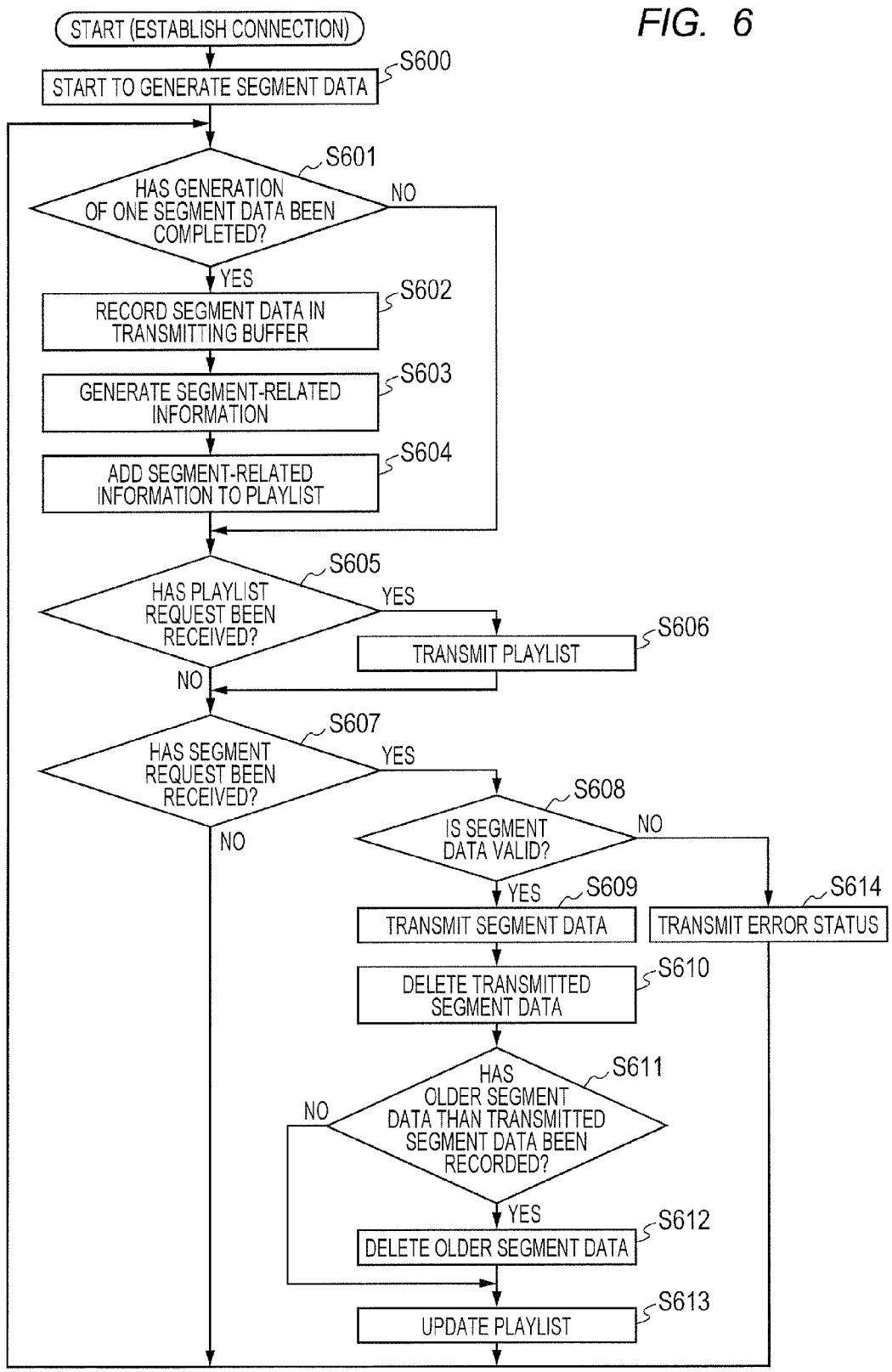
FIG. 6 is a flowchart illustrating processing performed by the imaging device.

In a live streaming mode, detailed processing of the imaging device 100 and the user terminal 200 after establishment of connection of communication between the imaging device 100 and the user terminal 200 will be described below. FIG. 6 is a flowchart illustrating processing performed by the imaging device 100. This processing is repeatedly performed until live streaming ends. In step S600, the CPU 101 in the imaging device 100 performs processing for starting to generate segment data with the start of the live streaming. More specifically, the CPU 101 starts to output a signal from the image sensor 114.

The signal output from the image sensor 114 is converted into appropriate video image data by processing of the camera signal processing unit 115. The video image data is also delivered to the encoding/decoding processing unit 116. Information about a camera status is also delivered to the encoding/decoding processing unit 116. The encoding/decoding processing unit 116 compresses and encodes the received video image data at a predetermined bit rate and in a predetermined format. The encoding/decoding processing unit 116 further divides the video image data in units of a reference time length Ts (0.5 seconds in the present embodiment), to generate segment data.

In step S601, the CPU 101 confirms whether or not generation of one segment data has been completed by determination by inquiry (polling). Specifically, if the segment data is recorded in the RAM 103 or the like, the CPU 101 determines that the generation of the segment data has been completed. If the generation of the segment data has been completed (YES in step S601), the CPU 101 advances the processing to step S602. If the generation of the segment data has not been completed (NO in step S601), the CPU 101 advances the processing to step S605.

In the present embodiment, the CPU 101 confirms whether or not the generation of the segment data has been completed by the determination by inquiry (polling). However, the present invention is not limited to this. As another example, if writing of the segment data into the RAM 103 or the like has been detected, the CPU 101 may determine that the generation of the segment data has been completed by interrupt notification.

In step S602, the CPU 101 records the segment data in the transmitting buffer. In step S603, the CPU 101 generates segment-related information. The segment-related information is information including a time length of the segment data and path information of the segment data. In the present embodiment, the time length of the segment data is a fixed value (0.5 seconds that is a reference time length). In step S604, the CPU 101 adds the segment-related information, which has been generated in step S602, to a playlist.

Figure 7A:
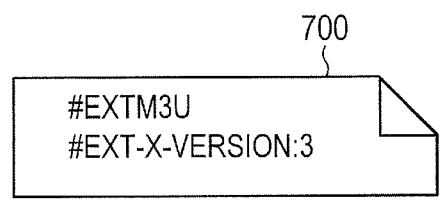
FIGS. 7A and 7B illustrate processing performed in step S604.
Figure 7B:
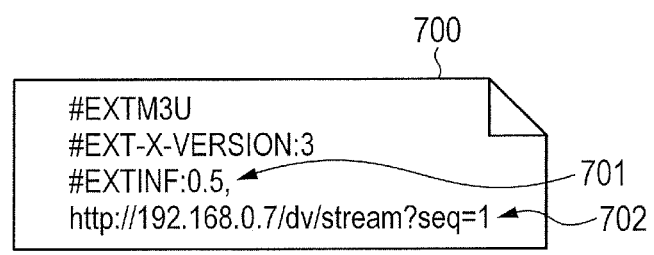

FIGS. 7A and 7B are figures for explaining the process in step S604. FIG. 7A illustrates a playlist 700 before the process in step S604. FIG. 7B illustrates a playlist 700 after the process in step S604. A reference time length 701 and path information 702 are added in step S604 to the playlist 700 after the process in step S604.

Referring to FIG. 6 again, in step S605, the CPU 101 confirms whether or not the playlist request (S406) has been received. If the playlist request has been received (YES in step S605), the CPU 101 advances the processing to step S606. If the playlist request has not been received (NO in step S605), the CPU 101 advances the processing to step S607. In step S606, the CPU 101 transmits the playlist to the user terminal 200 as a response to the playlist request. In step S607, the CPU 101 confirms whether or not the segment request (step S409) has been received. If the segment request has been received (YES in step S607), the CPU 101 advances the processing to step S608. If the segment request has not been received (NO in step S607), the CPU 101 advances the processing to step S601.

In step S608, the CPU 101 determines whether or not segment data relating to the segment request is valid. If the segment data is valid (YES in step S608), the CPU 101 advances the processing to step S609. If the segment data is invalid (NO in step S608), the CPU 101 advances the processing to step S614. In step S609, the CPU 101 transmits the segment data relating to the segment request as a response to the segment request. In step S610, the CPU 101 deletes the segment data that has been transmitted in step S609 (transmitted segment data) from the transmitting buffer.

In step S611, the CPU 101 then confirms whether or not segment data, which has been generated before the transmitted segment data, i.e., segment data that is older than the transmitted segment data in terms of generation timings has been recorded in the transmitting buffer. If the older segment data has been recorded (YES in step S611), the CPU 101 advances the processing to step S612. If the older segment data has not been recorded (NO in step S611), the CPU 101 advances the processing to step S613.

In step S612, the CPU 101 deletes the older segment data than the transmitted segment data from the transmitting buffer. In step S613, the CPU 101 then updates the playlist in response to the deletion of the segment data, and then advances the processing to step S601. More specifically, path information of the deleted segment data is deleted from the playlist. For example, if segment data corresponding to seq=1 has been deleted in step S610, the reference time length 701 and the path information 702 are deleted from the playlist 700 illustrated in FIG. 7B, to obtain the playlist 700 illustrated in FIG. 7A.

On the other hand, in step S614, the CPU 101 transmits an error status as a response to the segment request, and advances the processing to step S601.

As described above, the imaging device 100 updates the playlist at two timings, i.e., a timing at which new segment data has been generated and a timing at which the segment data has been transmitted to the user terminal 200.

Processing timings in steps S601, S605, and S607 are not limited to those in the embodiment. As another example, the CPU 101 may simultaneously wait for events in steps S601, S605, and S607. In this case, the CPU 101 may perform subsequent processing in the order of occurrence of the events.

Figure 8:
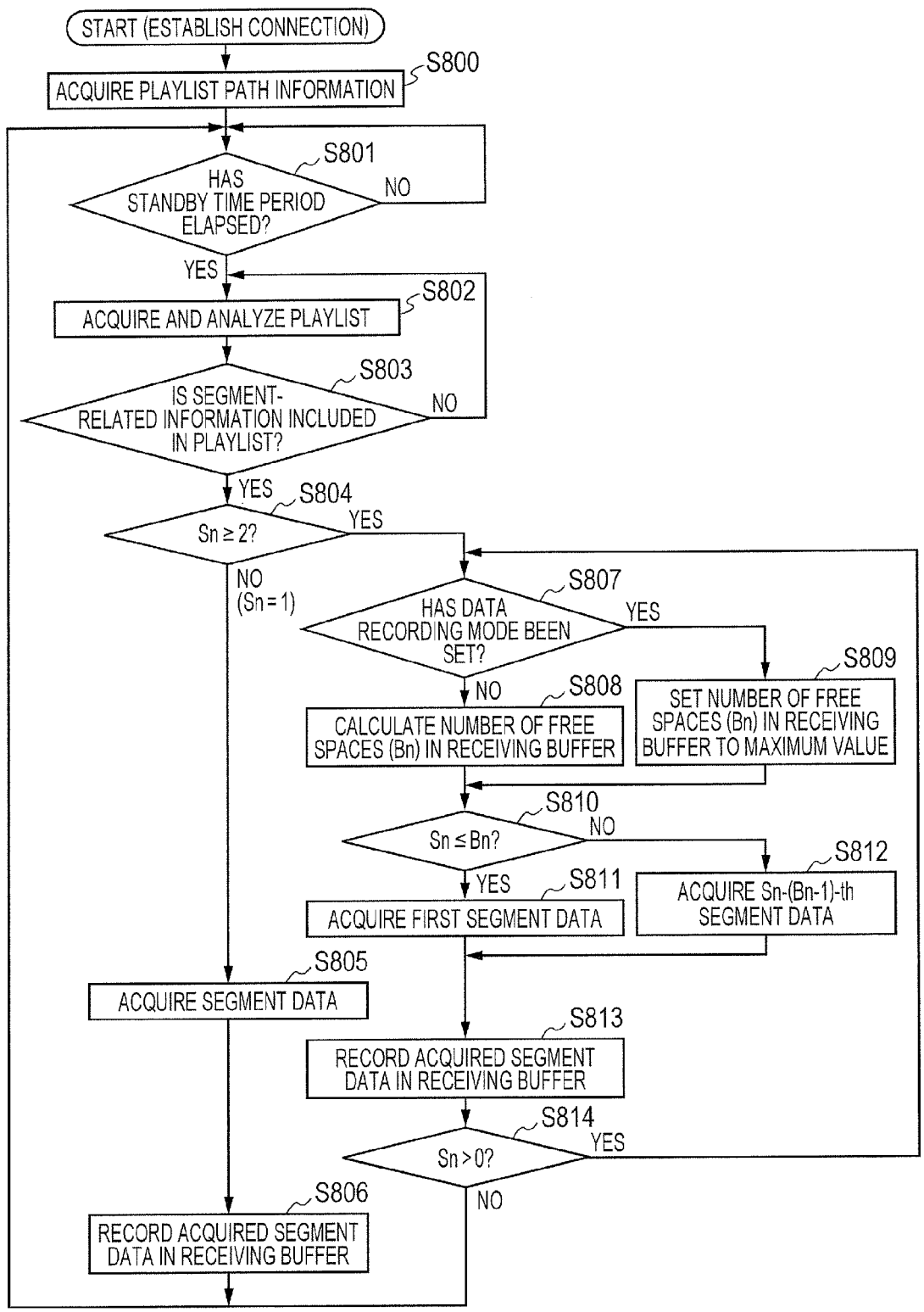
FIG. 8 is a flowchart illustrating processing performed by a user terminal.
Figure 10B:
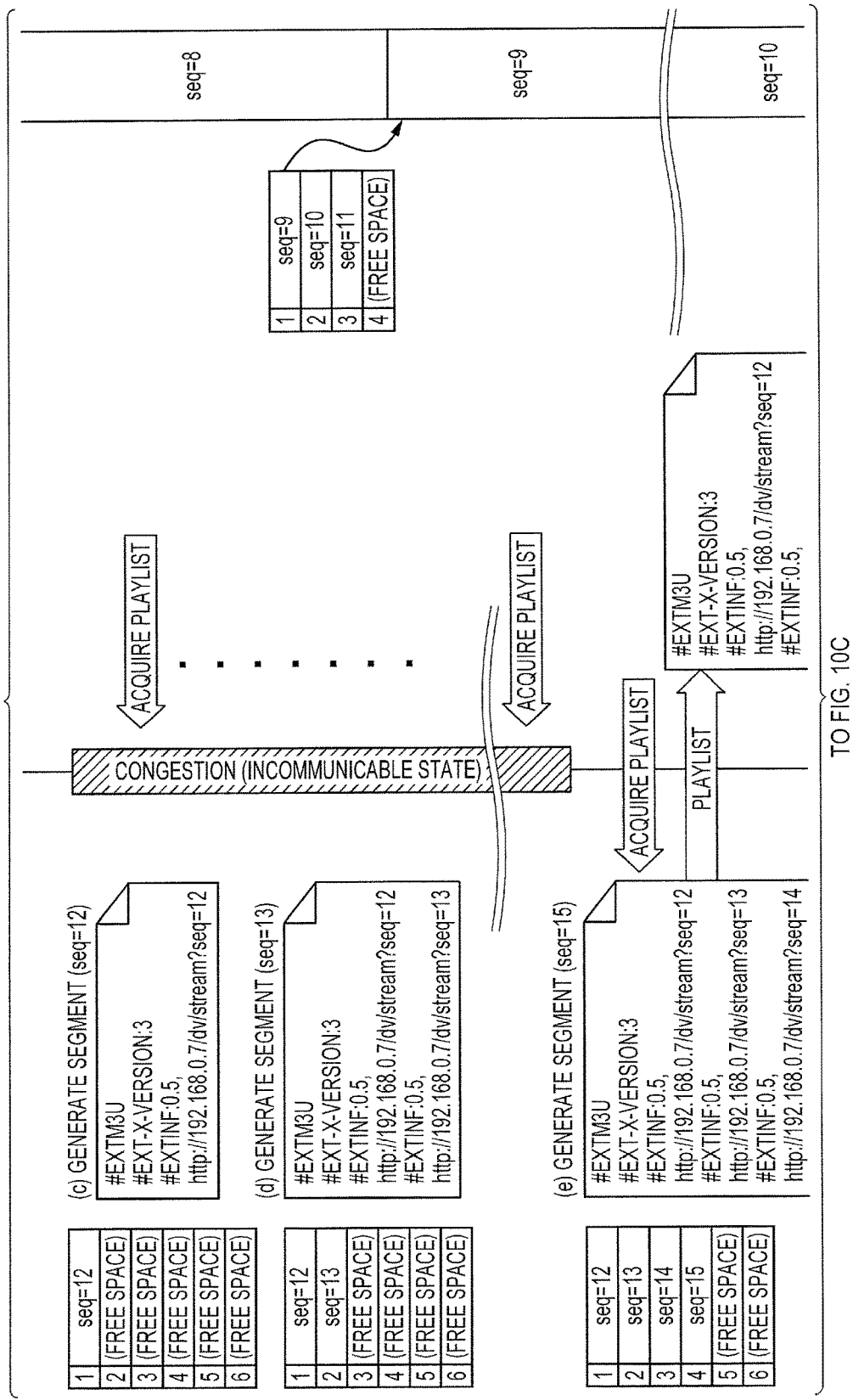
FIG. 10 is comprised of FIGS. 10A, 10B and 10C illustrating a situation of live streaming during congestion.
Figure 10C:
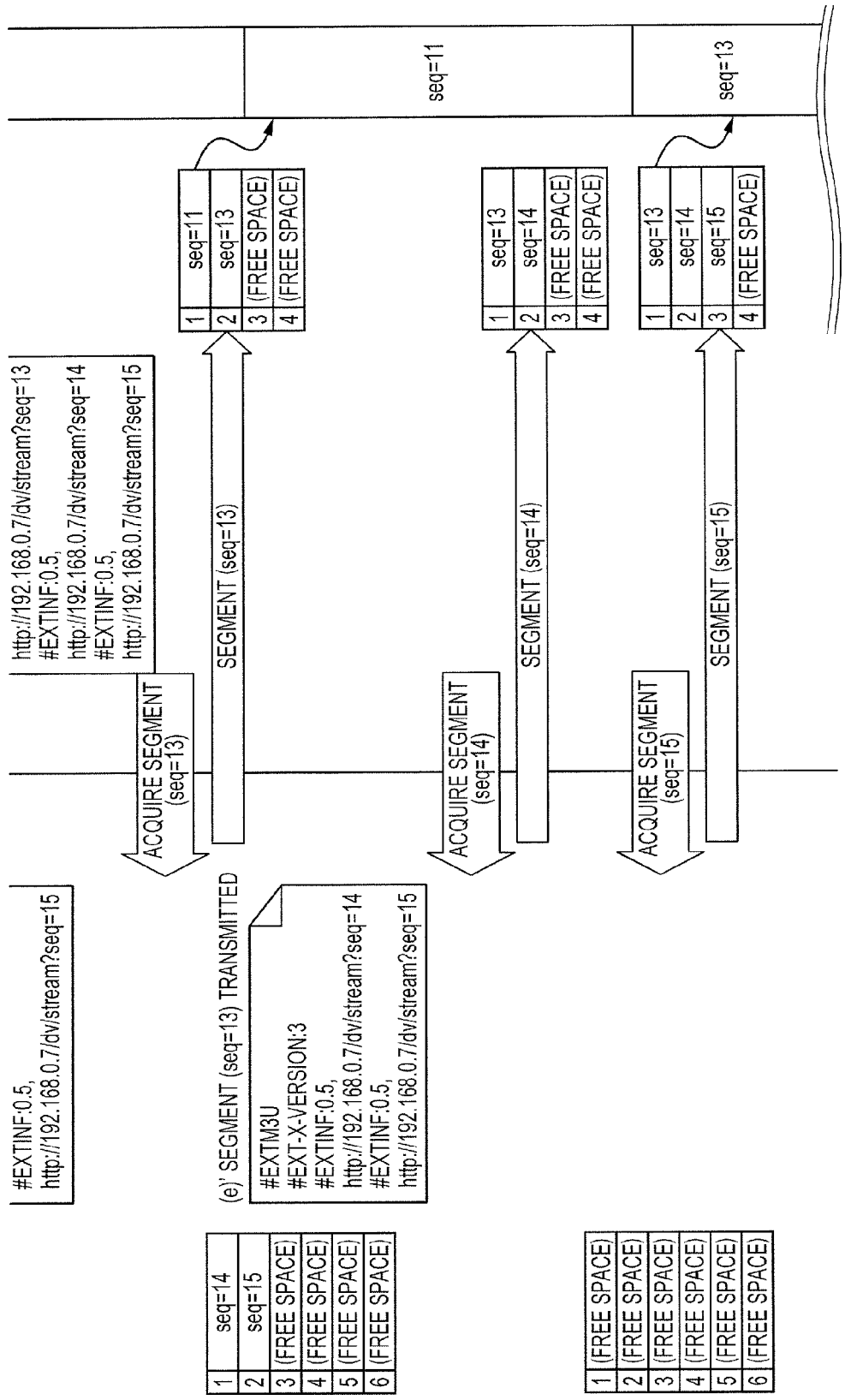

FIG. 8 is a flowchart illustrating processing performed by the user terminal 200. This processing is repeatedly performed until live streaming ends. Before starting the processing illustrated in FIG. 8, the user operates the buffer size setting icon 307, and the CPU 201 accepts the instruction to set the buffer size.

In step S800, the CPU 201 acquires the device information and the playlist path information (S402), and stores the information in the RAM 203 or the like. In step S801, the CPU 201 then waits until a standby time period elapses after receiving the device information and the like. If the standby time period has elapsed (YES in step S801), the CPU 201 advances the processing to step S802. The standby time period is substantially equal to or slightly less than a reference time length. The standby time period is preset in the ROM 202, for example.

In step S802, the CPU 201 acquires a playlist, and analyzes the playlist. Specifically, the CPU 201 specifies a transmission destination of a playlist request based on playlist path information that has been acquired from the imaging device 100 during connection. The CPU 201 transmits the playlist request to the imaging device 100 specified as the transmission destination (step S406). The CPU 201 receives the playlist from the imaging device 100 as a response to the playlist request. The CPU 201 confirms a format and a version of the playlist using an identification tag in the analysis of the playlist.

In step S803, the CPU 201 then confirms whether or not the playlist includes segment-related information. If the playlist includes the segment-related information (YES in step S803), the CPU 201 advances the processing to step S804. If the playlist does not include the segment-related information (NO in step S803), the CPU 201 advances the processing to step S802. In step S804, the CPU 201 confirms the number of segment data (Sn) included in the segment-related information. If the number of segment data (Sn) is two or more (YES in step S804), the CPU 201 advances the processing to step S807. If the number of segment data (Sn) is less than two, i.e., one (NO in step S804), the CPU 201 advances the processing to step S805. In step S805, the CPU 201 determines the segment data corresponding to the segment-related information included in the playlist as an acquisition target. This processing is an example of determination processing. The CPU 201 transmits a segment request to a transmission destination specified by path information in the segment-related information included in the playlist (step S409). The CPU 201 acquires the segment data as a response to the segment request (step S410). This processing is an example of acquisition processing. In step S806, the CPU 201 then records the received segment data in the receiving buffer, and the CPU 201 advances the processing to step S801. This processing is an example of recording processing. The buffer size of the receiving buffer is set in the buffer size setting icon 307 described with reference to FIG. 3.

On the other hand, in step S807, the CPU 201 confirms whether or not a data recording mode is set. If the data recording mode is set (YES in step S807), the processing proceeds to step S809. If the data recording mode is not set (NO in step S807), the CPU 201 advances the processing to step S808.

In step S808, the CPU 201 calculates the number of free spaces (Bn) in the receiving buffer. The number of free spaces in the receiving buffer is a value obtained by converting a free capacity of the receiving buffer into the number of recordable segment data. If a reference time length is 0.5 seconds, a total capacity of the receiving buffer is 1.5 seconds, and the number of segment data (its data size corresponds to 0.5 seconds) recorded in the receiving buffer is 1, for example, the number of free spaces in the receiving buffer is two from an (Equation 1);

$$1.5 \text{ (sec)}/0.5 \text{ (sec)}-1=2 \qquad \text{(Equation 1)}$$

In step S809, the CPU 201 sets a maximum number of free spaces in the number of free spaces (Bn) in the receiving buffer. The maximum number of free spaces is a value obtained by dividing the buffer size (time length) of the receiving buffer, which has been set in the buffer size setting icon 307, by the reference time length.

In step S810, the CPU 201 compares the number of segment data (Sn) included in the segment-related information with the number of free spaces (Bn) in the receiving buffer. If the number of segment data (Sn) is not more than the number of free spaces (Bn) in the receiving buffer (YES in step S810), the CPU 201 advances the processing to step S811. If the number of segment data (Sn) is more than the number of free spaces (Bn) in the receiving buffer (NO in step S810), the CPU 201 advances the processing to step S812.

The number of segment data included in the segment-related information is a value corresponding to the sum of the data sizes of the segment data to be acquired. The processing in step S810 is an example of comparison processing for comparing the sum of the data sizes with the free capacity of the receiving buffer.

In step S811, the CPU 201 determines, among the plurality of pieces of segment data corresponding to the plurality of pieces of segment-related information included in the playlist, the segment data, which is the oldest in terms of generation timings as an acquisition target. The plurality of pieces of segment data corresponding to the plurality of pieces of segment-related information included in the playlist is referred to as first, second, segment data in the order of generation timings.

The CPU 201 further transmits a segment request based on the path information in the segment-related information corresponding to the segment data that is the oldest in terms of generation timings (the first segment data). The CPU 201 acquires the oldest segment data (the first segment data) from the imaging device 100 as a response to the segment request.

On the other hand, in step S812, the CPU 201 determines the Sn−(Bn−1)-th segment data among the plurality of pieces of segment data corresponding to the plurality of pieces of segment-related information included in the playlist as an acquisition target. The CPU 201 transmits the segment request based on the path information in the segment-related information of the segment data to be acquired, and acquires the Sn−(Bn−1)-th segment data from the imaging device 100 as a response to the segment request.

As described above, if the data recording mode is set, Sn is always equal to and less than Bn (Sn Bn). Thus, the CPU 201 always acquires the first segment data. More specifically, the CPU 201 sequentially determines a plurality of pieces of segment data in ascending order of generation timings as an acquisition target when the data recording mode is set. Thus, while the data recording mode is set, a deficit in the segment data can be reduced even if congestion occurs.

In step S813, the CPU 201 records the acquired segment data in the receiving buffer. If the imaging device 100 is set in the data recording mode, the user terminal 200 couples a data portion obtained by removing a header from the decoded data or the segment data to a recorded data portion, and records the coupled data portions in the recording medium 212, in parallel with the processing shown in FIG. 8.

In step S814, the CPU 201 then confirms the number of segment data (Sn), which have not been received, among the segment data corresponding to the segment-related information included in the playlist. If the number of segment data (Sn) is more than zero (YES in step S814), the CPU 201 advances the processing to step S807. If the number of segment data (Sn) is zero (NO in step S814), the CPU 201 advances the processing to step S801. The above-mentioned processing premises that a processing time period from step S804 to step S814 is not significantly longer than the reference time length.

As another example, if the number of segment data (Sn) is more than zero, the CPU 201 confirms an elapsed time period from a timing at which the playlist path information has been received in step S800. The CPU 201 may proceed the processing to step S801 if the elapsed time period is a time threshold value or more, and may proceed to step S807 if the elapsed time period is less than the threshold value.

Figure 11B:
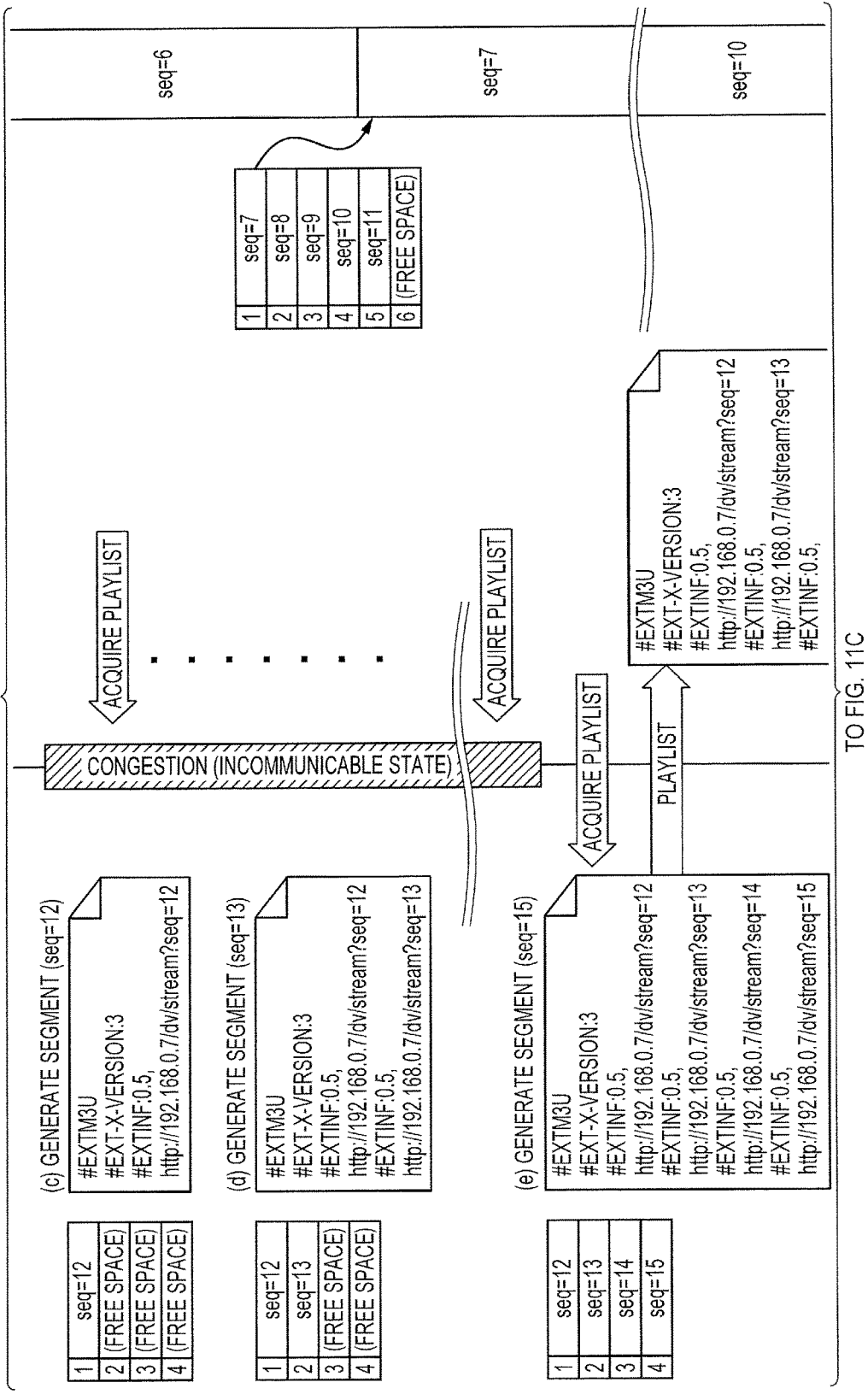
FIG. 11 is comprised of FIGS. 11A, 11B and 11C illustrating a situation of live streaming during congestion.
Figure 11C:
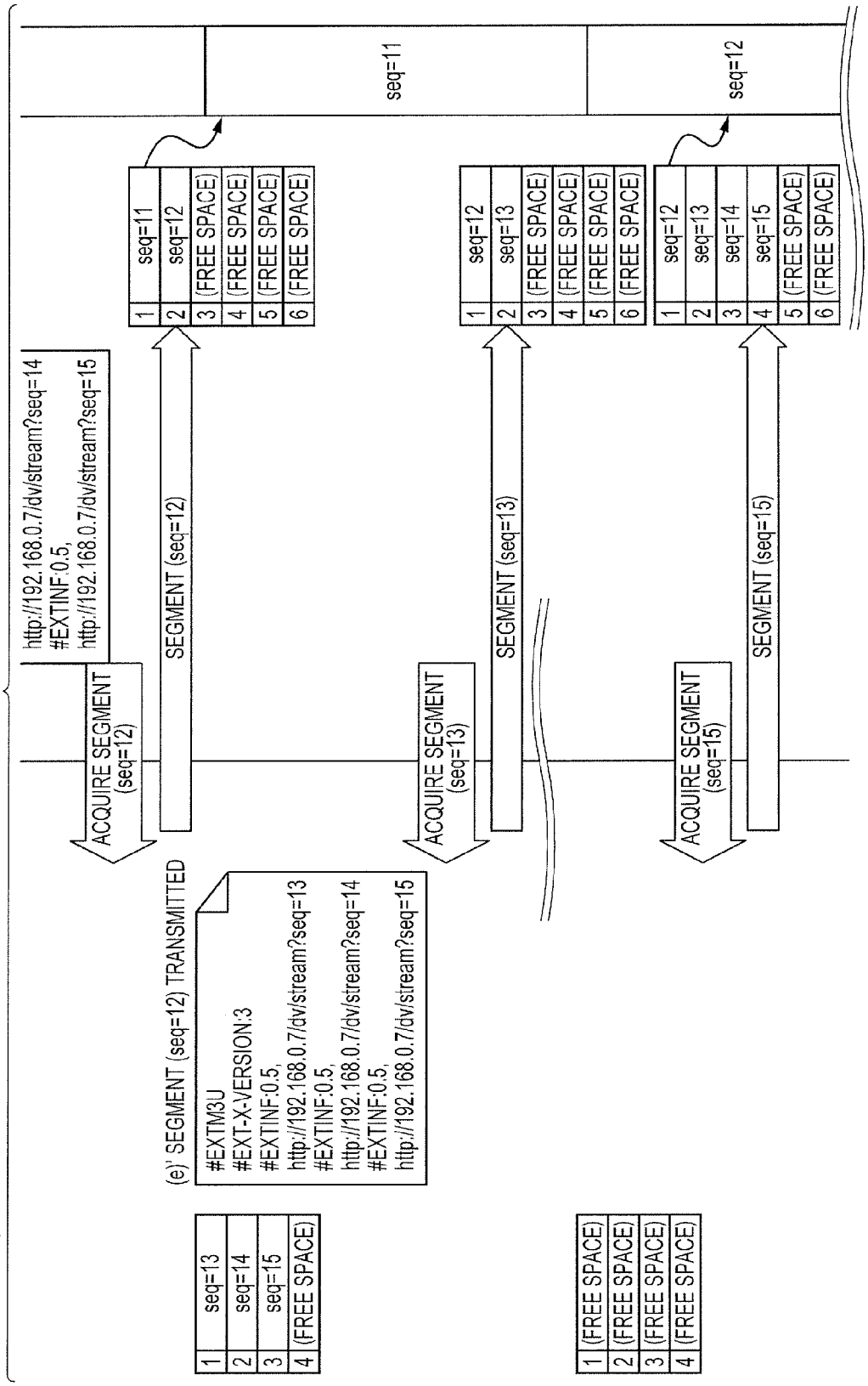

FIG. 9 which is comprised of FIGS. 9A to 9C, FIG. 10 which is comprised of FIGS. 10A to 10C, and FIG. 11 which is comprised of FIGS. 11A to 11C illustrate statuses of live streaming during congestion. If a maximum number of free spaces in the receiving buffer is one, as illustrated in FIGS. 9A to 9C, a deficit in segment data frequently occurs if the congestion occurs. On the other hand, as illustrated in FIGS. 10A to 10C and FIGS. 11A to 11C, if a maximum number of free spaces in the receiving buffer is set to a relatively large value, a deficit in segment data can be reduced even if congestion occurs.

As described above, according to each of the above-mentioned embodiments, appropriate data acquisition corresponding to an application of content data to be acquired can be implemented.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261445, filed Dec. 18, 2013, which is hereby incorporated by reference herein in its entirety.

What is claimed is:

1. An information processing device configured to communicate with an external device, said information processing device comprising:
   at least one processor; and
   a communication interface configured to communicate with the external device via a communication network,
   wherein the at least one processor is configured to function as:
   an accepting unit configured to accept an instruction to set a buffer size of a receiving buffer which forms part of the information processing device, wherein the receiving buffer receives segment data which is a piece of content data including at least one of video and audio, the segment data being generated at the external device and transmitted from the external device via the communication interface and the communication network;

a determining unit configured to determine, among a plurality of pieces of segment data to be acquired, the segment data to be acquired based on an available capacity of the receiving buffer of the buffer size set by the setting instruction, the determining unit determining to skip acquiring at least one piece of the segment data if the available capacity of the receiving buffer meets a predetermined condition;

an acquiring unit configured to acquire the segment data to be acquired from the external device via the communication interface; and a storing unit configured to store the segment data acquired by the acquiring unit in the receiving buffer, wherein the acquiring unit repeatedly acquires the segment data via the communication interface, and the segment data stored in the receiving buffer is sequentially reproduced as streaming data.

2. The information processing device according to claim 1, wherein the acquiring unit further acquires a list including information of the segment data transmittable by the external device, and the determining unit determines, based on the plurality of pieces of the information of the segment data included in the list, the segment data to be acquired.

3. The information processing device according to claim 1, wherein the at least one processor is configured to further function as a comparing unit configured to compare the sum of data sizes of the segment data to be acquired with the available capacity of the receiving buffer, wherein the determining unit determines the segment data to be acquired based on the available capacity when the sum of the data sizes is more than the available capacity of the receiving buffer.

4. The information processing device according to claim 1, wherein the determining unit sequentially determines the plurality of pieces of segment data as the segment data to be acquired in ascending order of generation timings when a recording mode in which the content data is recorded is set.

5. The information processing device according to claim 1, wherein the instruction to set the buffer size is input based on a user operation.

6. The information processing device according to claim 1, wherein the external device comprises an imaging unit configured to image an object to obtain the content data.

7. The information processing device according to claim 1, wherein the information processing device is a mobile phone.

8. The information processing device according to claim 1, wherein the information processing device is a tablet terminal.

9. A method of controlling an information processing device configured to communicate with an external device, said method comprising the steps of:

accepting an instruction to set a buffer size of a receiving buffer which forms part of the information processing device, wherein the receiving buffer receives segment data which is a piece of content data including at least one of video and audio, the segment data being generated at the external device and transmitted from the external device via a communication interface and a communication network;

determining, among a plurality of pieces of segment data to be acquired, the segment data to be acquired based on an available capacity of the receiving buffer of the buffer size set by the setting instruction and determining to skip acquiring at least one piece of the segment data if the available capacity of the receiving buffer meets a predetermined condition;

acquiring the segment data to be acquired from the external device; and storing the acquired segment data in the receiving buffer, wherein the segment data is repeatedly acquired, and the segment data stored in the receiving buffer is sequentially reproduced as streaming data.

10. The method according to claim 9, further comprising:

acquiring a list including information of the segment data transmittable by the external device, and determining, based on the plurality of pieces of the information of the segment data included in the list, the segment data to be acquired.

11. The method according to claim 9, further comprising:

comparing the sum of data sizes of the segment data to be acquired with the available capacity of the receiving buffer, and determining the segment data to be acquired based on the available capacity when the sum of the data sizes is more than the available capacity of the receiving buffer.

12. The method according to claim 9, further comprising sequentially determining the plurality of pieces of segment data as the segment data to be acquired in ascending order of generation timings when a recording mode in which the content data is recorded is set.

13. The method according to claim 9, wherein the instruction to set the buffer size is input based on a user operation.

14. The method according to claim 9, wherein the external device images an object to obtain the content data.

15. The method according to claim 9, wherein the information processing device is a mobile phone.

16. The method according to claim 9, wherein the information processing device is a tablet terminal.

17. A non-transitory computer readable recording medium storing a program that causes a computer to function as an information processing device of claim 1.

18. The information processing device according to claim 6, wherein imaging by the imaging unit and acquisition by the acquiring unit are performed in parallel with each other, and the acquiring unit acquires the segment data which is a piece of live content data.

19. The method according to claim 14, wherein imaging by the external device and the acquiring are performed in parallel with each other, and the segment data which is a piece of live content data is acquired.

* * * * *